Dec. 4, 1923.
S. J. CARROLL
1,476,392
PROCESS OF MAKING COMPOSITE FILMS
Filed Oct. 4, 1922
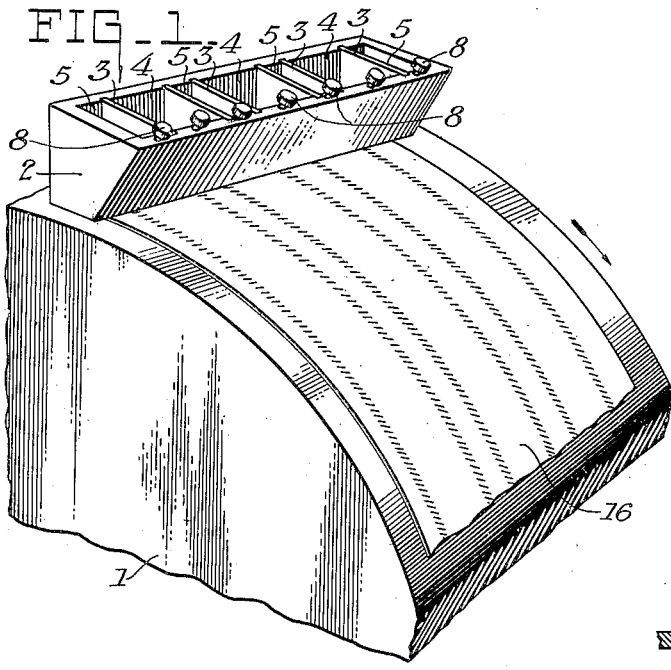
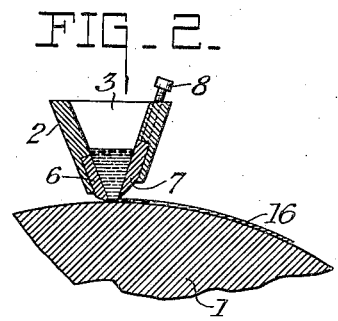
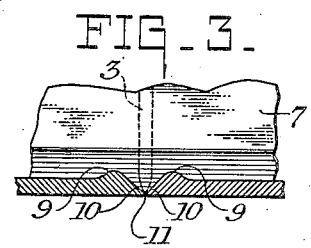
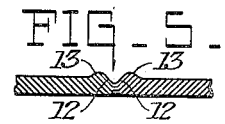
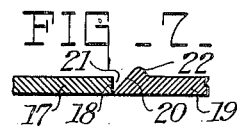
INVENTOR
Stewart J. Carroll,
BY R. L. Stinchfield
ATTORNEY Patented Dec. 4, 1923.

1,476,392

UNITED STATES PATENT OFFICE.

STEWART J. CARROLL, OF ROCHESTER, NEW YORK, ASSIGNOR TO EASTMAN KODAK COMPANY, OF ROCHESTER, NEW YORK, A CORPORATION OF NEW YORK.

PROCESS OF MAKING COMPOSITE FILMS.

Application filed October 4, 1922. Serial No. 592,343.

*To all whom it may concern:*

Be it known that I, STEWART J. CARROLL, a citizen of the United States of America, residing at Rochester, in the county of Monroe and State of New York, have invented certain new and useful Improvements in Processes of Making Composite Films, of which the following is a full, clear, and exact specification.

This invention relates to the making of composite film and is an improvement upon the general type of process disclosed in the application of Frank W. Lovejoy, No. 570,640, filed June 24, 1922, for Process of making composite film. The principal object of this invention is to avoid the trapping of air bubbles in the film during the manufacture thereof. Other objects will hereinafter appear.

In the accompanying drawing, Fig. 1 is a diagrammatic fragmentary perspective view showing one apparatus by which my process may be carried out, the parts being relatively exaggerated for the sake of clearness;

Fig. 2 is a fragmentary sectional view of the apparatus shown in Fig. 1;

Fig. 3 is a diagrammatic fragmentary view of the spreading blades of the apparatus, part of a film blank being shown in section;

Figs. 4, 5, and 6 are diagrammatic sectional views on an exaggerated scale of a film blank in the successive stages through which it passes as its parts are joined together;

Fig. 7 is a similar view of a modification.

In the prior application, mentioned above, there is disclosed a process in which strips of cellulosic material are joined edge to edge into a blank out of which the ultimate product is made by other steps, an explanation of which is unnecessary for the understanding of my invention. It has been found that when the edges of these strips are united while in a plastic or flowable condition, small bubbles of air sometimes become entrapped in the resulting union or weld. They not only weaken such union, but may be located so far out of line that they will enter the picture area of a finished product or film. I have discovered that the trapping of these bubbles may be avoided by contacting the edges of the strips to form a groove between them and then closing said groove from the bottom outward.

The principle of my invention may be applied in various ways. One of them will now be described by way of example. Above a moving surface, such as that of a large smooth wheel 1 of the well known film making type, is located a trough 2, divided by vertical partitions 3 into a series of separate compartments 4, which alternate with adjacent compartments 5. The partitions 3 at their lower ends are either made very thin or else converge to a sharp edge, as indicated by dotted lines in Fig. 3. At the bottom of each compartment is a slot at substantially right angles to the direction of movement of the surface of wheel 1, said slot being formed between blades 6 and 7, the latter being adjustable by means of screws 8. While there may be an independently adjustable blade 7 for each compartment, I have shown the simpler form in which a continuous blade 7 is used which is common to all of the compartments. Adjacent each partition 3 the lower sharpened or beveled edge of blade 7 is formed with upward curves 9 which merge with the downwardly extending edges 10 which meet at 11.

By way of illustration, the compartments 4 may be charged with one cellulosic composition and the compartments 5 with a different composition. These compositions are then allowed to flow out upon the surface of moving wheel 1, thereby forming film strips of which are defined by the upper surfaces of blade 7. The compartments 4 may, for example, contain a cellulose acetate composition which has acetone therein and the compartments 5 may contain a nitrocellulose dope which likewise contains acetone. The ingredients are so proportioned and the working conditions are so adjusted that film strips of approximately the same thickness are formed on the moving surface. Moreover, the edges of the strips will be in a plastic or flowable condition so that each can move or flow relative to the edge of the adjacent strip. Of course, the temporary adhesion of the strips to the smooth surface keeps them in proper relative position while this uniting movement of the edges is effected.

As the strips flow under the blades 7, their edges are provided with beveled portions 12 and with curved thickened portions or beads 13. Since the strips come into contact at their bottom surfaces at or just after passing the point 11 of the blade 7, a groove 15 will be formed between the said strips, as is clearly indicated in Fig. 4. The bottom of the groove is substantially at the surface of the wheel 1. Because of the plastic or flowable condition of the beads 13, the latter tend to move toward each other and fill up the groove from the bottom, as indicated in Figs. 5 and 6. On account of the closing of the groove from the bottom outward no air can become trapped or pocketed along the line of union. The result is a finished blank 16 composed of strips united together at their edges.

After sufficient volatile solvent has evaporated, the strips and joints between them acquire enough strength to permit the whole composite sheet to be stripped from the film wheel surface, as will be understood by those skilled in the film making art.

In the modification of my invention illustrated in Fig. 7, a strip 17 may be already formed and set with a suitable edge, which is here shown by way of example as a vertical one 18. Alongside of this strip there is flowed a second strip composed of a composition in a plastic or flexible state having a solvent which is common to both strips 17 and 19. Thus if strip 17 be of nitrocellulose and 19 be of cellulose acetate, the composition may contain acetone. The strip 19 is formed with an edge 20 which first meets the vertical edge 18 of strip 17 in such a way as to form groove 21. In the present instance the edge 20 is shown as being beveled. At the edge 20 there is likewise surplus material in the form of bead 22, which settles down into groove 21, closing the latter from the bottom upward in a way analogous to the closure of groove 15, as shown in Figs. 4, 5, and 6.

Having thus described my invention, what I claim as new and desire to secure by Letters Patent is:

1. The process of making a composite cellulosic film which comprises the steps of locating film strips edge to edge and uniting said edges by forming a groove between said edges and closing said groove from the bottom outward.

2. The process of making a composite cellulosic film which comprises the steps of bringing the edges of film strips into contact to form a groove between them, at least one of said edges being in a plastic condition, and effecting relative movement of said plastic edge and the other edge to close said groove progressively from the bottom outward.

3. The process of making a composite cellulosic film which comprises the steps of bringing the edges of film strips into contact to form a groove between them, at least one of said strips being deposited from a flowable cellulose composition and being still in a plastic state at the time of said contact, and effecting movement of an edge of said plastic strip relative to the other strip to progressively close said groove from the bottom outward.

4. The process of making a composite cellulosic film which comprises the steps of depositing film strips from flowable cellulosic compositions containing a volatile solvent, the edges of said strips being shaped and directed to contact and form grooves between them while sufficient of said solvent remains therein for effecting their union, and effecting the closing of said grooves from the bottom outward by progressive union of the walls of the grooves under the action of said solvent.

5. The process of making a composite cellulosic film which comprises the steps of depositing film strips on a film forming surface from flowable cellulosic compositions, the edges of said strips being shaped and directed to contact at said surface and form grooves opening outward from said surface, and closing said grooves from the bottom outward by flowing the edges to progressively unite the walls of the grooves outwardly.

6. The process of making a composite cellulosic film which comprises the steps of bringing into contact the edges of film strips composed of different cellulosic materials to form a groove between them, at least one of said edges being in a plastic condition and containing a common solvent of said materials, and effecting movement of said plastic edge relative to the other edge to close said groove progressively from the bottom outward and unite said strips under the action of said common solvent.

7. The process of making a composite cellulosic film which comprises the steps of shaping film strips on a film forming surface from flowable cellulosic compositions, the edge of at least one of said strips being beveled and in contact with the other edge at said surface and flowing said edges together.

8. The process of making a composite cellulosic film which comprises the steps of depositing nitrocellulose and acetylcellulose strips on a film forming surface from flowable compositions, at least one of which contains acetone, the edges of said strips being shaped and directed to contact first at said surface and then to unite progressively outward from said surface under the action of said acetone.

Signed at Rochester, New York, this 27th day of September 1922.

STEWART J. CARROLL.